(12) United States Patent
Chaudhry et al.

(10) Patent No.: US 9,135,264 B2
(45) Date of Patent: Sep. 15, 2015

(54) DISTRIBUTED CATALOG, DATA STORE, AND INDEXING

(75) Inventors: Puneesh Chaudhry, Northbridge, MA (US); Sanjay Jain, Northborough, MA (US)

(73) Assignee: COPIUN, INC., Northborough, MA (US)

( * ) Notice: Subject to any disclaimer, the term of this patent is extended or adjusted under 35 U.S.C. 154(b) by 18 days.

(21) Appl. No.: 13/047,273

(22) Filed: Mar. 14, 2011

(65) Prior Publication Data

US 2011/0225141 A1    Sep. 15, 2011

Related U.S. Application Data

(60) Provisional application No. 61/313,316, filed on Mar. 12, 2010.

(51) Int. Cl.
*G06F 7/00* (2006.01)
*G06F 17/00* (2006.01)
*G06F 17/30* (2006.01)

(52) U.S. Cl.
CPC ................ *G06F 17/30132* (2013.01)

(58) Field of Classification Search
CPC ............ G06F 17/30743; G06F 17/30749; G06F 17/30772; G06F 17/30159; G06F 17/30067; G06F 17/30873
See application file for complete search history.

(56) References Cited

U.S. PATENT DOCUMENTS

| | | | |
|---|---|---|---|
| 5,590,810 A | 1/1997 | Wehbi | |
| 5,873,104 A | 2/1999 | Tremblay et al. | |
| 5,990,810 A | 11/1999 | Williams | |
| 6,065,046 A | 5/2000 | Feinberg et al. | |
| 6,269,431 B1* | 7/2001 | Dunham | 711/162 |
| 6,526,493 B1 | 2/2003 | Ding | |
| 6,564,215 B1* | 5/2003 | Hsiao et al. | 1/1 |
| 6,704,730 B2 | 3/2004 | Moulton et al. | |
| 6,704,755 B2* | 3/2004 | Midgley et al. | 1/1 |
| 6,742,081 B2 | 5/2004 | Talagala et al. | |
| 6,941,436 B2 | 9/2005 | Lee et al. | |
| 6,959,291 B1 | 10/2005 | Armstrong et al. | |
| 6,976,146 B1 | 12/2005 | Aiello et al. | |
| 7,051,180 B2 | 5/2006 | Downer et al. | |
| 7,065,619 B1 | 6/2006 | Zhu et al. | |
| 7,272,602 B2 | 9/2007 | Moulton | |
| 7,305,532 B2 | 12/2007 | Zhu et al. | |

(Continued)

FOREIGN PATENT DOCUMENTS

| | | |
|---|---|---|
| KR | 10-2004-0091392 A | 10/2004 |
| WO | WO-2010/080591 | 7/2010 |

(Continued)

OTHER PUBLICATIONS

International Search Report and Written Opinion of the International Searching Authority, the Korean Intellectual Property Office, for International Application No. PCT/US2011/028318, date of mailing Sep. 27, 2011, 7 pages.

(Continued)

*Primary Examiner* — Susan Chen
(74) *Attorney, Agent, or Firm* — EIP US LLP

(57) ABSTRACT

This disclosure relates to a system and method for distributed catalog processing, data caching, and indexing to create an efficient, scalable, secure, high availability, disaster recovery enabled backup and storage system.

24 Claims, 3 Drawing Sheets

(56) References Cited

U.S. PATENT DOCUMENTS

| | | |
|---|---|---|
| 7,373,464 B2 | 5/2008 | Zhu et al. |
| 7,430,616 B2 * | 9/2008 | Husain et al. ............... 709/246 |
| 7,472,242 B1 | 12/2008 | Deshmukh et al. |
| 7,477,166 B2 | 1/2009 | McCanne et al. |
| 7,504,969 B2 | 3/2009 | Patterson et al. |
| 7,562,186 B2 | 7/2009 | Li et al. |
| 7,590,644 B2 | 9/2009 | Matsakis et al. |
| 7,624,335 B1 | 11/2009 | Maheshwari et al. |
| 7,827,150 B1 * | 11/2010 | Wu et al. ..................... 707/674 |
| 7,860,843 B2 * | 12/2010 | Dodd et al. .................. 707/693 |
| 7,925,683 B2 | 4/2011 | Jain et al. |
| 7,979,569 B2 | 7/2011 | Eisner et al. |
| 8,364,648 B1 * | 1/2013 | Sim-Tang ..................... 707/674 |
| 8,489,830 B2 * | 7/2013 | Wu et al. ...................... 711/162 |
| 2002/0169972 A1 | 11/2002 | Tanaka et al. |
| 2003/0131154 A1 | 7/2003 | Downer et al. |
| 2003/0212873 A1 | 11/2003 | Lee et al. |
| 2004/0073835 A1 * | 4/2004 | Kim ............................... 714/13 |
| 2004/0091392 A1 * | 5/2004 | McBride et al. ............... 422/57 |
| 2005/0050459 A1 | 3/2005 | Qu et al. |
| 2005/0216669 A1 | 9/2005 | Zhu et al. |
| 2006/0047855 A1 | 3/2006 | Gurevich et al. |
| 2006/0059171 A1 | 3/2006 | Borthakur et al. |
| 2006/0069719 A1 | 3/2006 | McCanne et al. |
| 2006/0069733 A1 | 3/2006 | Antonoff et al. |
| 2006/0109909 A1 | 5/2006 | Chang et al. |
| 2006/0206669 A1 | 9/2006 | Zhu et al. |
| 2006/0212439 A1 * | 9/2006 | Field ................................. 707/4 |
| 2007/0028110 A1 | 2/2007 | Brennan |
| 2007/0061544 A1 | 3/2007 | Uppala |
| 2007/0143359 A1 | 6/2007 | Uppala |
| 2007/0239945 A1 | 10/2007 | Li et al. |
| 2007/0239946 A1 | 10/2007 | Zhu |
| 2008/0013830 A1 | 1/2008 | Patterson et al. |
| 2008/0050025 A1 | 2/2008 | Bashyam et al. |
| 2008/0050026 A1 | 2/2008 | Bashyam et al. |
| 2008/0050027 A1 | 2/2008 | Bashyam et al. |
| 2008/0050029 A1 | 2/2008 | Bashyam et al. |
| 2008/0050047 A1 | 2/2008 | Bashyam et al. |
| 2008/0082525 A1 | 4/2008 | Cha et al. |
| 2008/0133835 A1 | 6/2008 | Zhu et al. |
| 2008/0159331 A1 | 7/2008 | Mace et al. |
| 2008/0183767 A1 | 7/2008 | Zhu et al. |
| 2008/0256143 A1 | 10/2008 | Reddy et al. |
| 2008/0270729 A1 | 10/2008 | Reddy et al. |
| 2008/0281908 A1 | 11/2008 | McCanne et al. |
| 2008/0294660 A1 | 11/2008 | Patterson et al. |
| 2008/0320106 A1 | 12/2008 | McCanne et al. |
| 2008/0320151 A1 | 12/2008 | McCanne et al. |
| 2009/0063528 A1 | 3/2009 | Yueh |
| 2009/0063795 A1 | 3/2009 | Yueh |
| 2009/0079597 A1 | 3/2009 | McCanne et al. |
| 2009/0216774 A1 | 8/2009 | Rao et al. |
| 2009/0216788 A1 | 8/2009 | Rao et al. |
| 2009/0240718 A1 | 9/2009 | Rao et al. |
| 2009/0265397 A1 | 10/2009 | Williams |
| 2009/0287725 A1 | 11/2009 | von Praun |
| 2009/0289819 A1 | 11/2009 | Mahoney |
| 2010/0161608 A1 | 6/2010 | Jain et al. |
| 2010/0161685 A1 | 6/2010 | Jain et al. |
| 2011/0231374 A1 | 9/2011 | Jain et al. |

FOREIGN PATENT DOCUMENTS

| | | |
|---|---|---|
| WO | WO-2011/113042 | 9/2011 |
| WO | WO-2011/116087 | 9/2011 |

OTHER PUBLICATIONS

International Search Report and Written Opinion of the International Searching Authority the Korean Intellectual Property Office for PCT/US2009/068687, mailing date of Aug. 3, 2010, 7 pages.

\* cited by examiner

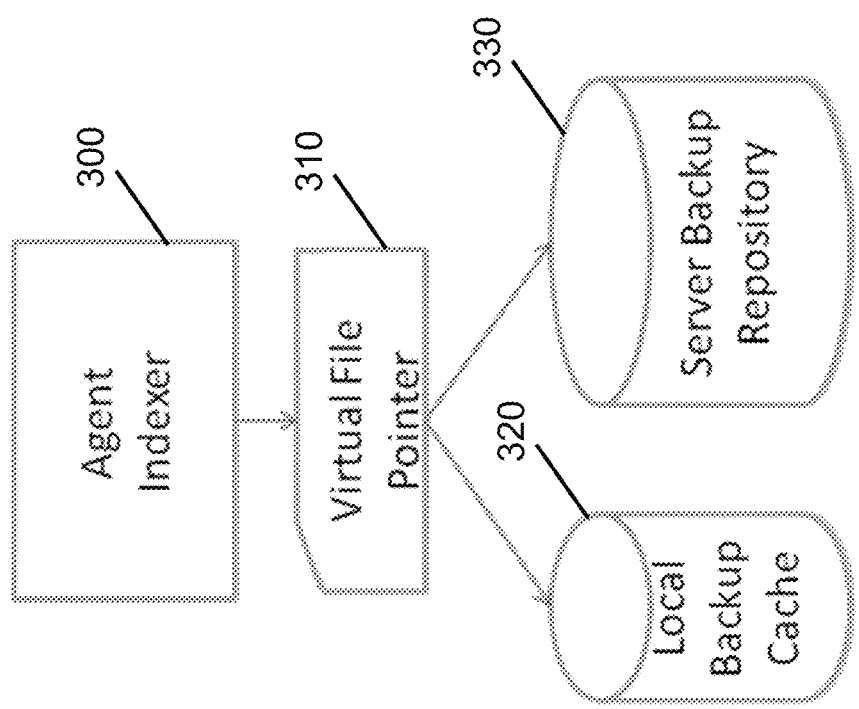

DISTRIBUTED CATALOG, DATA STORE, AND INDEXING

CROSS-REFERENCE TO RELATED APPLICATIONS

This application claims priority to U.S. Provisional Application 61/313,316 filed Mar. 12, 2010, the entire contents of which are incorporated herein by reference.

FIELD OF THE DISCLOSURE

This disclosure relates to data management systems.

BACKGROUND

Data management systems, such as backup servers and file-servers, are typically designed to be centrally stored, managed, and searched. Such systems are available to a user only when the user is connected to the system. These centralized systems also tend to be expensive systems which need a lot of computational and storage capacity along with high throughput to service the access workload of thousands of remote users.

Security may be an issue for people accessing centralized data. In part, this is an issue because centralized data can contain not only those files appropriate for viewing or manipulation by a particular user, but also files the particular user should not have access to. For example, a centralized data management system may contain files from other users, as well as files at levels of security access above the access level granted to the particular user.

In contrast to centralized systems, data management systems may also be distributed with storage nodes that are disconnected from one another. However, such distributed data storage systems generally do not work well, and require much more storage and computational ability at the end points. These computational requirements can increase rapidly with the number of users being supported by the system.

BRIEF DESCRIPTION OF THE DRAWINGS

FIG. 3 illustrates an implementation of distributed indexing using a virtual file pointer in accordance with some embodiments.

OVERVIEW

Figure 1:
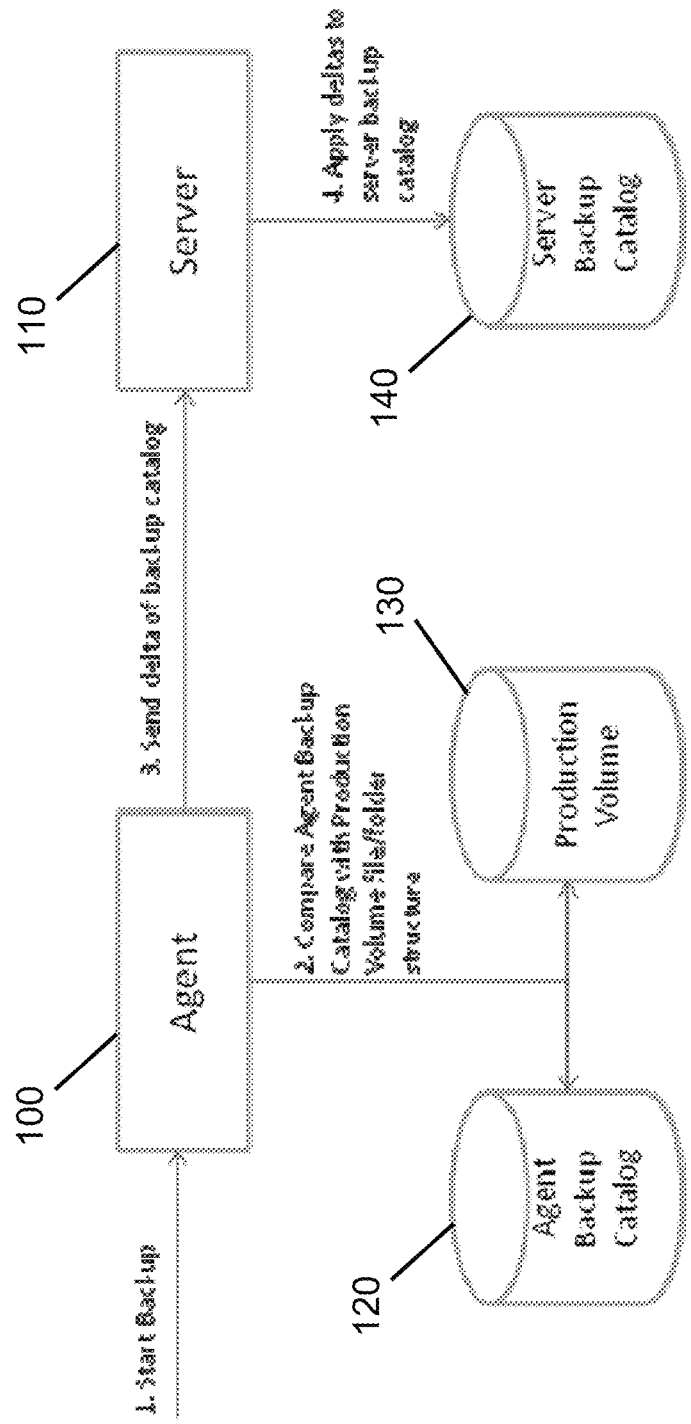
FIG. 1 illustrates an implementation of managing a distributed backup catalog for one or more client devices in accordance with some embodiments.

In a first set of embodiments, a method comprises comparing a local catalog on a first computer system to a production file system to identify a first file, the first file having metadata and existing within the production file system; identifying a set of storage blocks to represent the first file; transferring the first file to a local cache on the first computer system, where the first file is represented in the local cache as the set of storage blocks, and where the set of storage blocks is a subset of a larger set of local cache blocks that represent other files within the production file system, and where each of the local cache blocks is capable of being stored both within the local cache and on a storage server on a second computer system; creating a delta entry in the local catalog on the first computer system, where the delta entry includes metadata relating to the first file and associated with an indication of the time the delta entry was created; transferring the first file to the storage server by transferring the set of storage blocks to the storage server; and updating a remote catalog on the second computer system to reflect the metadata in the delta entry. Certain of these embodiments further comprise determining if the local cache has reached a size limit; if the local cache has reached the size limit, identifying, within the set of local cache blocks in the local cache, a candidate block that had previously been backed up successfully to the storage server, where identifying the candidate block comprises comparing a timestamp of the candidate block with a time of a last successful storage of the local cache to the storage server; and deleting the candidate block to reduce the size of the local cache. Certain of these embodiments further comprise repopulating the local cache with storage blocks that had previously been deleted from the local cache. Other embodiments further comprise: building on the first computer system a searchable index of files, the files including the first file, where a file pointer is associated with the first file, and where the file pointer is also associated with the identity of the set of storage blocks that represent the first file; identifying, using the index, the file pointer to the first file; identifying, using the file pointer, the set of storage blocks that represent the first file, where the set of storage blocks include a subset of local blocks that are located on the first computer system, and a subset of remote blocks that are not located on the first computer system; transferring to the first computer system the subset of remote blocks; and reconstructing the first file from a combination of the local and remote blocks, where in some such embodiments, building the searchable index of files includes crawling for file contents using the file pointer. In still other embodiments, the first file was modified after a first point in time, and only those entries in the local catalog that were entered after the first point in time are sent to the second computer system. Additional embodiments include where the first file is identified at least in part because the first file was deleted from the production file system, where the first file is identified at least in part because the first file was added to or modified within the production file system; where the local catalog is configured to include entries corresponding to multiple storage clients; where transferring the first file to the storage server includes: determining if the first file can be sent to the storage server on the second computer system; and transferring the first file to the storage server and updating the remote catalog at a point in time when the first file can be sent to the storage server; where the steps of comparing a local catalog to a production file system, identifying a set of storage blocks, transferring to a local cache, creating a delta entry in the local catalog, transferring to a storage server, and updating a remote catalog are performed by a third and a fourth computer system such that the third and fourth computer systems use the same storage server and remote catalog as the first computer system uses.

A second set of embodiments include logic encoded in one or more non-transient media that includes code for execution and when executed by a processor is operable to perform operations comprising any one or more of the above-described embodiments.

A third set of embodiments include a local catalog on a first computer system; a local cache on the first computer system; a production file system; a remote catalog on a second computer system; a storage server on the second computer system; an agent running on the first computer; a memory on the first computer system capable of storing data; and a processor on the first computer system configured to perform operations comprising any one or more of the above-described embodiments.

DESCRIPTION OF EXAMPLE EMBODIMENTS

I. Distributed Catalog

Backup systems have a catalog to keep track of what data has been backed up. This catalog is a repository where metadata for data backed up in the system is stored. This catalog is typically generated on a central backup server as follows: (a) each backup client sends a snapshot of its entire directory and file structure to the backup server as part of every backup session; and (b) the backup server then compares the snapshot thus received with the current version of the catalog to determine additions and deletions to the backup catalog. In such systems, the entire snapshot may need to be sent to the central backup server as a way of determining, for example, when files are deleted.

When a client needs to perform recovery, it connects to the backup server to search through the entire central catalog for files that it needs.

This approach can cause expensive processing requirements; have a lack of access to backups when a user is offline; have security issues; and have a central backup server as a single point of failure, meaning that if the backup server is not operating or reachable, the entire backup set is unavailable.

Sending an entire directory and file structure (or an entire local catalog) every day can cause significant daily processing on the backup server, including requiring going through millions of catalog entries every day even though the number of catalog entries that change every day are small. Additionally, all catalog access also needs to be done on the backup server, requiring that the backup server have enough processing horsepower to service the workload of thousands of users.

For example, assume a machine has the following directory structure:
C:
    Folder1
        File1-A with modification time T10
        File1-B with modification time T20
        Folder1-1
            File1-1-A with modification time T30
            File1-1-B with modification time T40
        Folder1-2
            File1-2-A with modification time T50
            File1-2-B with modification time T60
    Folder2
        File2-A with modification time T70
        File2-B with modification time T80
        Folder2-1
            File2-1-A with modification time T90
            File2-1-B with modification time T100
        Folder2-2
            File2-2 -A with modification time T110
            File2-2 -B with modification time T120

The first time the backup is done, the entire backup catalog is moved from local machine to server, i.e., the following backup catalog entries are moved:
1. C:
2. Folder1 is child of C:
3. File1-A is child of Folder1 with modification time T10
4. File1-B is child of Folder1 with modification time T20
5. Folder1-1 is child of Folder1
6. File1-1-A is child of Folder1-1 with modification time T30
7. File1-1-B is child of Folder1-1 with modification time T40
8. Folder1-2 is child of Folder2
9. Filet-2-A is child of Folder1-2 with modification time T50
10. Filet-2-B is child of Folder1-2 with modification time T60
11. Folder2 is child of C:
12. File2-A is child of Folder2 with modification time T70
13. File2-B is child of Folder2 with modification time T80
14. Folder2-1 is child of Folder2
15. File2-1-A is child of Folder2-1 with modification time T90
16. File2-1-B is child of Folder2-1 with modification time T100
17. Folder2-2 is child of Folder2
18. File2-2 -A is child of Folder2-2 with modification time T110
19. File2-2 -B is child of Folder2-2 with modification time T120

Now assume the following activity happens on the machine
1. File1-2-C is added in Folder1-2 at time T150
2. File1-1-A is deleted from Folder1-1 at time T160
3. File2-1-B in Folder2-1 is changed to newer version at time T170

As a result of above activity the File Structure looks like following:
C:
    Folder1
        File1-A with modification time T10
        File1-B with modification time T20
        Folder1-1
            File1-1-B with modification time T30
        Folder1-2
            File1-2-A with modification time T50
            File1-2-B with modification time T60
            File1-2-C with modification time T150
    Folder2
        File2-A with modification time T70
        File2-B with modification time T80
        Folder2-1
            File2-1-A with modification time T90
            File2-1-B with modification time T170
        Folder2-2
            File2-2 -A with modification time T110
            File2-2 -B with modification time T120

As a result, a traditional backup client will send the following new backup catalog (or equivalent file structure) to the backup server:
1. C:
2. Folder1 is child of C:
3. File1-A is child of Folder1 with modification time T10
4. File1-B is child of Folder1 with modification time T20
5. Folder1-1 is child of Folder1
6. File1-1-A is child of Folder1-1 with modification time T30
7. Folder1-2 is child of Folder2
8. File1-2-A is child of Folder1-2 with modification time T50
9. Filet-2-B is child of Folder1-2 with modification time T60
10. File1-2-C is child of Folder1-2 with modification time T150
11. Folder2 is child of C:
12. File2-A is child of Folder2 with modification time T70
13. File2-B is child of Folder2 with modification time T80

14. Folder2-1 is child of Folder2
15. File2-1-A is child of Folder2-1 with modification time T90
16. File2-1-B is child of Folder2-1 with modification time T170
17. Folder2-2 is child of Folder2
18. File2-2 -A is child of Folder2-2 with modification time T110
19. File2-2 -B is child of Folder2-2 with modification time T120

The backup server now compares the two sets of catalogs in their entireties to determine what has changed and then records the changes in the backup catalog. Even in this simple example, for a change of 3 entries, 19 entries were sent over to the backup server. In a real life system, the number of entries sent to the backup server could be two to three orders of magnitude more than the number of entries that change. When multiplied by thousands of machines, this means that millions of catalog entries are sent regularly and analyzed regularly, requiring dramatically higher processor and memory power on the backup server.

No Offline Access to Backups

For machines that are frequently offline, the backup system is inaccessible if the machine is not on the corporate network.

Security

Typically, users' searches are performed on the entire catalog, and then the results are filtered according to the access control lists (ACLs) applied to the catalog entries. If there is a bug in the filtering mechanism, the end user can get access to the entire backup catalog, thus posing a significant security risk.

Single Point of Failure

If the backup server is down, the entire backup set is unavailable.

Distributed Catalog

In certain embodiments described here, a copy of a backup catalog specific to each backup client is kept at the backup client. The comparison of backup catalogs happens in a distributed manner at the backup client itself, such that only the changes in the backup catalog are sent over to backup server. The catalog can be configured to include the catalog for a single backup client or multiple backup clients.

In the simple example cited above, only the following information would be sent over to backup server:
1. File1-2-C is added in Folder1-2 at time T150
2. File1-1-A is deleted from Folder1-1
3. File2-1-B in Folder2-1 is changed to newer version at time T170

This method of keeping a local copy of the backup catalog at the source, and using it to compare to the production file system to detect the delta changes, can detect the following conditions at a source, and send only those delta changes pertinent to these changes to the backup server:
1. Rename of a file
2. Delete of a file
3. Modification of a file
4. Rename of the folder/directory
5. Delete of the folder/directory
6. Modification of folder/directory FIG. 1 shows an implementation of a system for managing a distributed backup catalog for one or more client devices. A backup agent 100 is implemented on, and is part of, a client computer or other client device. Multiple clients may typically have agents that communicate with a single central server 110. In some embodiments, the agent 100 receives a message to start a backup, which causes the agent to initiate a comparison of the agent backup catalog 120 with a production volume file/folder structure 130. After the comparison, the agent 100 sends the delta (changes) of the backup catalog to the server 110. The server applies the deltas to the server backup catalog 140. The server 110 (or a server system) can obtain apply deltas from a number of client devices, including more than 1000 clients.

The agent 100 and server 110 can each be provided by some combination of hardware and software logic including general purpose and/or special purpose processing functionality to provide at least one processor, which can include a microcontroller, microprocessor, or some other logic that can implement functions, such as logic that can execute stored instructions. The server can be implemented as one server or as multiple servers in communication with each other, and can include multiple processors. The agent and the server can each be implemented in software by executing instructions stored in a computer-readable medium. The client device (with the agent) and the server can be in the same location and communicate, for example, through a LAN, or can be located in a geographically remote manner and communicate through a wide area network (WAN).

The agent backup catalog, production volume, and server backup catalog are each represented by databases, but can include any form of suitable memory, such as magnetic, optical, or solid state memory.

The advantages of doing the distributed backup catalog can include one or more of the following:
1. Efficiency: The backup server does not have to do costly comparison of backup catalogs for each backup client in the system. Instead, each backup client can determine changes on its own. This approach can significantly reduce the workload on the backup server, reducing the need for high performance backup infrastructure. Since only deltas are sent over the network, it also reduces the network bandwidth requirements.
2. Offline access to catalog: Even if the backup client is not on the corporate network, the end user can still have access to the backup catalog for browsing and recovery.
3. High Availability: If the backup server goes down temporarily, the end user can still access the backup catalog and data for browsing and recovery.
4. Security: End users perform backup catalog browsing and recovery using their local backup catalog copy, which only contains the catalog for their own machine. This ensures that each end user can only browse that catalog and the user's own entries, and the user on one machine should not get access to the entire backup catalog on the entire company. This feature can be especially important when a self service recovery is provided to the end-user.
5. Disaster Recovery: In case the backup server loses the backup catalog, it can be reconstructed by getting the backup catalog from the distributed backup catalogs.
6. Reduced Load on Backup Server: Most backup catalog browsing requests can be satisfied by the local backup catalog; hence the server work load for browsing the backup catalog is drastically reduced.

II. Distributed Backup Data

The backup data in current backup systems is typically only stored at the backup server. This scheme can have disadvantages:

Heavy Load on the Backup Server

Recovery and browsing operations require the backup server to transmit large amount of data from the backup server. This puts significant load on the backup server, requiring high end infrastructure.

WAN Inefficiencies

All recovery and browsing operations require the backup server to transmit large amount of data from the backup server. Frequently, this data is transmitted over a wide area network (WAN), such as from a cloud backup server, or to a remote site for recovery, making the process both expensive and time-consuming. WAN recoveries can become impractical.

No Offline Access to Backups

For machines that are frequently offline, e.g., road warriors with laptops, they are unable to recover their files unless they are on the corporate network.

Single Point of Failure

If the backup server is down, the entire backup set is unavailable. Also, if the backup server disk crashes, the entire backup data can get lost.

Distributed Data Store

In some of the embodiments described here, the backup server data store is distributed. Each backup client's backup data is also stored in its local storage as a cache. The size of the cache can be configurable to store only the most recent backups or to store all backup versions on the backup client. The cache can also be configured to include the data for a single backup client or multiple backup clients.

Distributing the backup data store so that backup data is not only stored on the backup server, but also on backup clients can provide one or more of the following advantages:

1. WAN efficient: Since most recovery is done using the backup data from the local cache, recoveries are faster and do not consume precious WAN bandwidth.
2. Backup when not connected for continuous data protection: Even if the machine is not connected to the backup server, the backup can happen for the user changes to the local cache. This is especially required if continuous data protection is required by the backup system. In today's world where many end users like to work on a laptop while disconnected from company network, it can be a very useful feature.
3. Recovery when not connected: An end user can perform recoveries even if the machine is not connected to the backup server.
4. High Availability: If for some reason the backup server is temporarily offline, there is still access to the backup data.
5. Disaster Recovery: If the local backup cache is big enough to hold the entire backup data for each backup client, it can be used to enable a disaster recovery in situations when the backup server backup data is lost.
6. Reduction of load on server: Since most recovery is done using the backup data from the local cache, it drastically reduces the workload on the backup server of reading and sending the backup data to the machine during recoveries.

Figure 2:
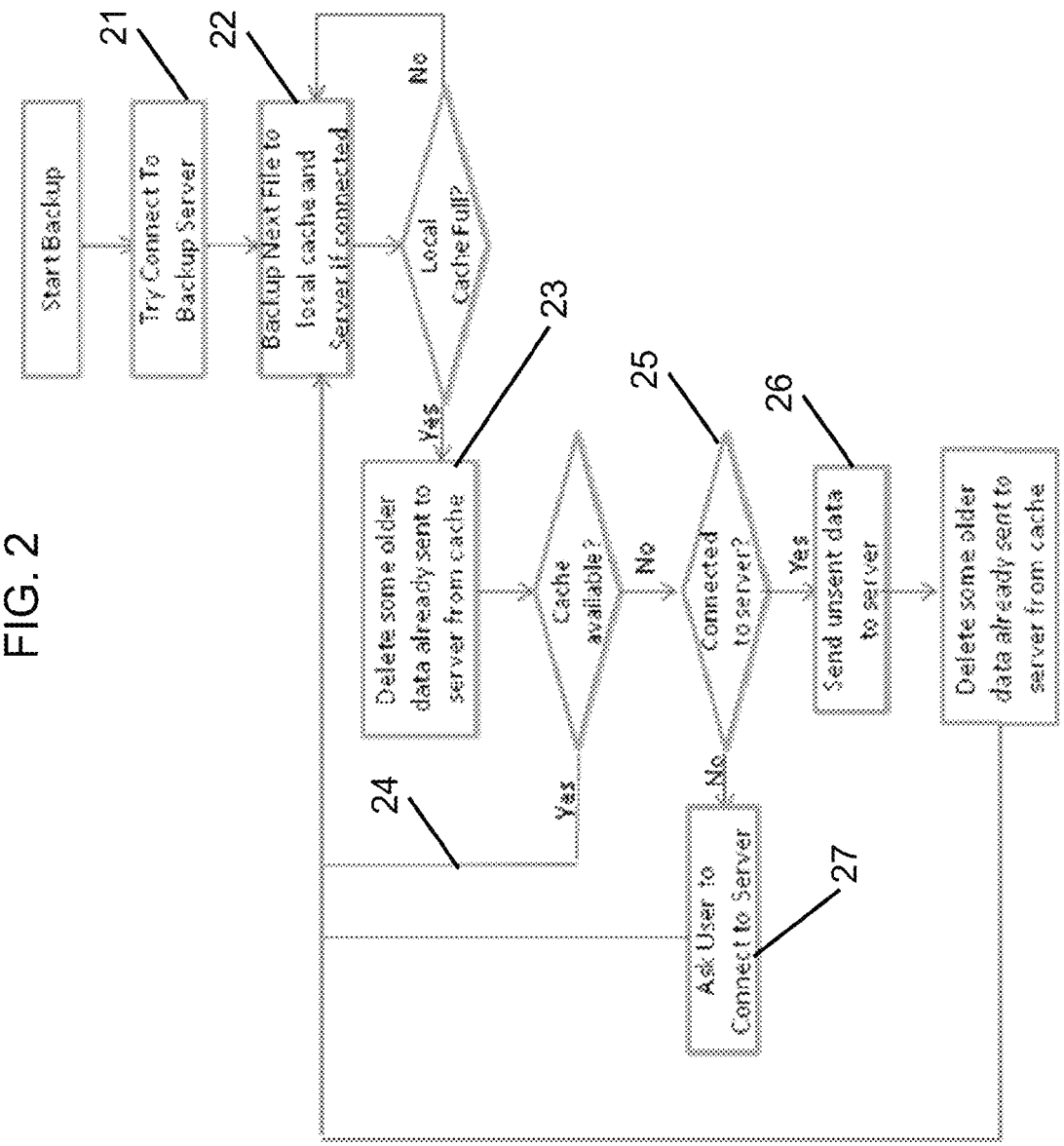
FIG. 2 illustrates an implementation of managing a distributed backup cache during backup in accordance with some embodiments.

FIG. 2 shows an implementation of acts performed to manage the backup cache during backup. During backup operation following steps are performed:

21. Connect to backup server if possible
22. Backup file to the local cache and to backup server (if connected)
23. If the local cache if full during the backup, then delete some older cache data which is already sent to backup server
24. If enough space is created during above step then start the backup of the file again
25. If enough space is not created in the cache, then check if Agent is connected to the backup server.
26. If Agent is connected to the backup server, then send the unsent data to backup server and delete some older cache data which is already sent to backup server
27. If Agent is not connected to the backup server, then show a message to the end-user to connect to backup server.

Determining Older Cache Data which is already sent to Backup Server

One method of determining which cache data is old is to first generate a list of blocks for backing up a file. Each of those referenced blocks at the Agent cache is updated with current time stamp during the backup. This method also tracks time of last backup which was successfully sent to backup server. All blocks with a time stamp earlier than a last backup that was successfully sent can be deleted if more space is required to perform the new backup.

Backup Data Cache Re-Populate during Restore

The backup data cache is also intelligently re-populated when recovery of a file requires backup data to be pulled from the backup server. It may so happen that the backup data cache on the Agent does not have the blocks required for performing recovery. In this case those blocks are pulled from the server backup data repository and used to re-populate the agent backup cache with those pulled blocks from server. This method may results in not pulling blocks for subsequent restore operation thus reducing the workload on server.

III. Distributed Indexing

Some backup systems index each backed up file for search at the server. The search can be metadata based search or full-text based search. The index is created on the backup server or another associated machine that can analyze and index the backed-up data. A user performing a search for a particular file logs on to the backup server and performs the search.

With this approach, an end-user searching for a file must search for the file on backup server. This approach creates a security issue where an end-user can get access to other user files accidentally. In addition, a scalable index needs to be built, and the user has to search in multiple places (own PC, backup server, file server etc).

Heavy Load on the Backup Server

Indexing and search operations are performed on the server. This requires significant horsepower on the backup server both to perform the initial and on-going indexing, plus servicing the search workload.

Highly Scalable Index

A typical backup server can have millions of individual files. If the backup server supports full-text search, it will require a highly scalable index which can index millions of files.

Typically, searching the index returns all files that meet the search criteria, unless the index has been made aware of the ACLs per file. This causes potential security concerns if an end user, while searching for their own document, is accidentally also shown the results from other users' files.

FIG. 3 shows an implementation of how an indexer at the Agent 300 can have a virtual file pointer 310 to provide a search at Agent machine.

In certain embodiments described here, indexing is done at the end-user machine at Agent Indexer 300. The Agent Indexer 300 at end-user machine is given a virtual file pointer 310. The indexer, when crawling for file contents, uses the virtual file pointer. When the end-user performs a search operation, the indexer shows the virtual file if the text was part of the file during indexing. When an end-user performs operation such as open the virtual file, the data for that file is constructed first using the blocks in local backup data cache 320. If some blocks are not found in local backup data cache then those are seamlessly recovered from the backup server block repository 330.

These embodiments can provide one or more of the following advantages:
1. Secure: The search operation is only happening on the end-user machine, which is only aware of file originated at that machine. There is no need to search through the entire server database.
2. Search for files when not connected: an end user can perform a full text search even when the machine is not connected to the backup server.
3. Reduction of search load on server: because the search operation is done on the end-user machine, server resources are not used.
4. High Availability: Even if the server if offline temporarily, the end user can still perform search operations.

Although the present disclosure has been described and illustrated in the foregoing example embodiments, it is understood that the present disclosure has been made only by way of example, and that numerous changes in the details of implementation of the disclosure may be made without departing from the spirit and scope of the disclosure, which is limited only by the claims which follow. Other embodiments are within the following claims. For example, the local cache and catalog may be configured to maintain a complete copy of the backup information for the local machine that is also maintained on the remote backup server.

What is claimed is:

1. A client computer system configured to manage distributed backup data, comprising:
   a data store comprising:
       computer-executable software;
       a production volume comprising a plurality of data files, and
       an agent backup catalog comprising local backup data corresponding to remote backup data stored in a remote backup catalog of a remote server;
   a processor in data communication with the data store and configured to execute the software, the software being configured to implement an agent indexer on the client computer system and to cause the agent indexer to build an index for the production volume by crawling through file contents of the production volume using a virtual file pointer,
   the software being further configured to implement a backup agent on the client computer system and to cause the backup agent to:
       receive a message from a local user to start a backup process;
       generate change data based on a comparison of the agent backup catalog and the production volume; and
       send the change data to the remote server, the change data comprising metadata that indicates one or more differences between the current state of the production volume and the agent backup catalog, and the change data being configured to be used by the remote sever to update the remote backup data stored in the remote backup catalog.

2. The client computer system of claim 1, wherein the backup agent is further configured to: update the agent backup catalog based on the change data.

3. The client computer system of claim 1, wherein the backup agent is further configured to:
   identify, based on the change data, a file in the production volume to be backed-up to the remote server;
   transfer a plurality of storage blocks corresponding to the identified file to a local cache on the client computer system; and
   transfer the plurality of storage blocks corresponding to the file to the remote server.

4. The client computer system of claim 3, wherein the backup agent is further configured to:
   determine that the local cache has exceeded a capacity threshold;
   determine a timestamp associated with each storage block of the plurality of storage blocks in the local cache, the timestamp for each respective storage block indicating a time at which the respective block was last backed up to the remote server;
   delete any respective storage block when the timestamp for the respective storage block precedes a time of the last successful backup to the remote server.

5. The client computer system of claim 3, wherein the backup agent is further configured to:
   receive an instruction to recover a file;
   determine that the file is not stored in a local cache on the client computer system;
   request the file from the remote server;
   receive a plurality of storage blocks associated with the file from the remote server; and
   store the plurality of storage blocks associated with the file in the local cache.

6. The client computer system of claim 1, wherein the agent backup catalog is a subset of the remote backup catalog on the remote server.

7. The client computer system of claim 1, wherein the agent backup catalog is associated with a single user and the remote backup catalog on the remote server is associated with a plurality of users, including the single user.

8. The client computer system of claim 1, wherein the remote backup data stored in the remote backup catalog of the remote server corresponding to the local backup data is only a subset of the total backup data stored in the remote backup catalog.

9. A method of managing distributed backup data on a client computer system an agent backup catalog, the method comprising:
   building, by an agent indexer, an index for a production volume comprising a plurality of data files by crawling through file contents of the production volume using a virtual file pointer;
   receiving, at a backup agent, a message from a local user to start a backup process;
   generating, by the backup agent, change data based on a comparison of an agent backup catalog comprising local backup data corresponding to remote backup data stored in a remote backup catalog of a remote server and the production volume; and
   sending, from the backup agent, the change data to the remote server, the change data comprising metadata that indicates one or more differences between the current state of the production volume and the agent backup catalog, and the change data being configured to be used by the remote sever to update the remote backup data stored in the remote backup catalog.

10. The method of claim 9, further comprising: updating, by the backup agent, the agent backup catalog based on the change data.

11. The method of claim 9, further comprising:
   identifying, by the backup agent, a file in the production volume to be backed-up to the remote server based on the change data;

transferring, by the backup agent, a plurality of storage blocks corresponding to the identified file to a local cache on the client computer system;

transferring, by the backup agent, the plurality of storage blocks corresponding to the file to the remote server.

12. The method of claim 11, further comprising:

determining, by the backup agent, that the local cache has exceeded a capacity threshold;

determining, by the backup agent, a timestamp associated with each storage block of the plurality of storage blocks in the local cache, the timestamp for each respective storage block indicating a time at which the respective block was last backed up to the remote server;

deleting, by the backup agent, any respective storage block when the timestamp for the respective storage block precedes a time of the last successful backup to the remote server.

13. The method of claim 11, further comprising:

receiving, at the backup agent, an instruction to recover a file;

determining, by the backup agent, that the file is not stored in the local cache on the client computer system;

requesting, by the backup agent, the file from the remote server;

receiving, at the backup agent, a plurality of storage blocks associated with the file from the remote server; and storing, by the backup agent, the plurality of storage blocks associated with the file in the local cache.

14. The method of claim 9, wherein the agent backup catalog is a subset of the remote backup catalog on the remote server.

15. The method of claim 9, wherein the agent backup catalog is associated with a single user and the remote backup catalog on the remote server is associated with a plurality of users, including the single user.

16. The method of claim 9, wherein the remote backup data stored in the remote backup catalog of the remote server corresponding to the local backup data is only a subset of the total backup data stored in the remote backup catalog.

17. A non-transitory, computer-readable medium comprising computer-executable instructions that, when executed by a processor in a client computer system, cause the client computer system to perform a method of managing distributed backup data on the system, the method comprising:

building, by an agent indexer, an index for a production volume comprising a plurality of data files by crawling through file contents of the production volume using a virtual file pointer;

receiving, at a backup agent, a message from a local user to start a backup process;

generating, by the backup agent, change data based on a comparison of an agent backup catalog comprising local backup data corresponding to remote backup data stored in a remote backup catalog of a remote server and the production volume; and sending, from the backup agent, the change data to the remote server, the change data comprising metadata that indicates one or more differences between the current state of the production volume and the agent backup catalog, and the change data being configured to be used by the remote sever to update the remote backup data stored in the remote backup catalog.

18. The non-transitory, computer-readable medium of claim 17, wherein the method further comprises: updating, by the backup agent, the agent backup catalog based on the change data.

19. The non-transitory, computer-readable medium of claim 17, wherein the method further comprises:

identifying, by the backup agent, a file in the production volume to be backed-up to the remote server based on the change data;

transferring, by the backup agent, a plurality of storage blocks corresponding to the identified file to a local cache on the client computer system;

transferring, by the backup agent, the plurality of storage blocks corresponding to the file to the remote server.

20. The non-transitory, computer-readable medium of claim 19, wherein the method further comprises:

determining, by the backup agent, that the local cache has exceeded a capacity threshold;

determining, by the backup agent, a timestamp associated with each storage block of the plurality of storage blocks in the local cache, the timestamp for each respective storage block indicating a time at which the respective block was last backed up to the remote server;

deleting, by the backup agent, any respective storage block when the timestamp for the respective storage block precedes a time of the last successful backup to the remote server.

21. The non-transitory, computer-readable medium of claim 19, wherein the method further comprises:

receiving, at the backup agent, an instruction to recover a file;

determining, by the backup agent, that the file is not stored in the local cache on the client computer system;

requesting, by the backup agent, the file from the remote server;

receiving, at the backup agent, a plurality of storage blocks associated with the file from the remote server; and storing, by the backup agent, the plurality of storage blocks associated with the file in the local cache.

22. The non-transitory, computer-readable medium of claim 17, wherein the agent backup catalog is a subset of the remote backup catalog on the remote server.

23. The non-transitory, computer-readable medium of claim 17, wherein the agent backup catalog is associated with a single user and the remote backup catalog on the remote server is associated with a plurality of users, including the single user.

24. The non-transitory, computer-readable medium of claim 17, wherein remote backup data stored in the remote backup catalog of the remote server corresponding to the local backup data is only a subset of the total backup data stored in the remote backup catalog.

* * * * *